United States Patent
Panchaksharaiah et al.

(10) Patent No.: US 12,126,853 B2
(45) Date of Patent: Oct. 22, 2024

(54) METHODS AND SYSTEMS FOR OPERATING A GROUP WATCHING SESSION

(71) Applicant: ROVI GUIDES, INC., San Jose, CA (US)

(72) Inventors: Vishwas Sharadanagar Panchaksharaiah, Karnataka (IN); Anjum Makkar, Punjab (IN); Harshith Kumar Gejjegondanahally Sreekanth, Karnataka (IN); Pawan Nagdeve, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/673,312

(22) Filed: Feb. 16, 2022

(65) Prior Publication Data
US 2023/0262280 A1 Aug. 17, 2023

(51) Int. Cl.
*H04N 21/43* (2011.01)
*H04N 21/442* (2011.01)
*H04N 21/4788* (2011.01)

(52) U.S. Cl.
CPC . *H04N 21/43076* (2020.08); *H04N 21/44204* (2013.01); *H04N 21/4788* (2013.01)

(58) Field of Classification Search
CPC ....... H04N 21/43076; H04N 21/44204; H04N 21/4788
See application file for complete search history.

(56) References Cited

U.S. PATENT DOCUMENTS

| | | | |
|---|---|---|---|
| 10,536,542 B1* | 1/2020 | Dorner | H04L 51/52 |
| 2007/0283403 A1* | 12/2007 | Eklund, II | H04N 21/4788 725/117 |
| 2014/0007170 A1* | 1/2014 | Klappert | H04N 5/782 725/97 |

* cited by examiner

*Primary Examiner* — Nathan J Flynn
*Assistant Examiner* — Christine A Kurien
(74) *Attorney, Agent, or Firm* — Haley Guiliano LLP

(57) ABSTRACT

Systems and methods are described for operating a group watching session, in which a group watching session for presentation of a media content item is initiated at a first participant device and a second participant device; a segment of the media content item for which the presentation of the media content item is to be synchronized at the first participant device and the second participant device is identified; a viewing progress of the media content item at the first participant device is determined to be different from a viewing progress of the media content item at the second participant device; and in response to the determining, the viewing progress at the first and second participant devices is synchronized for the presentation of the identified segment.

20 Claims, 8 Drawing Sheets

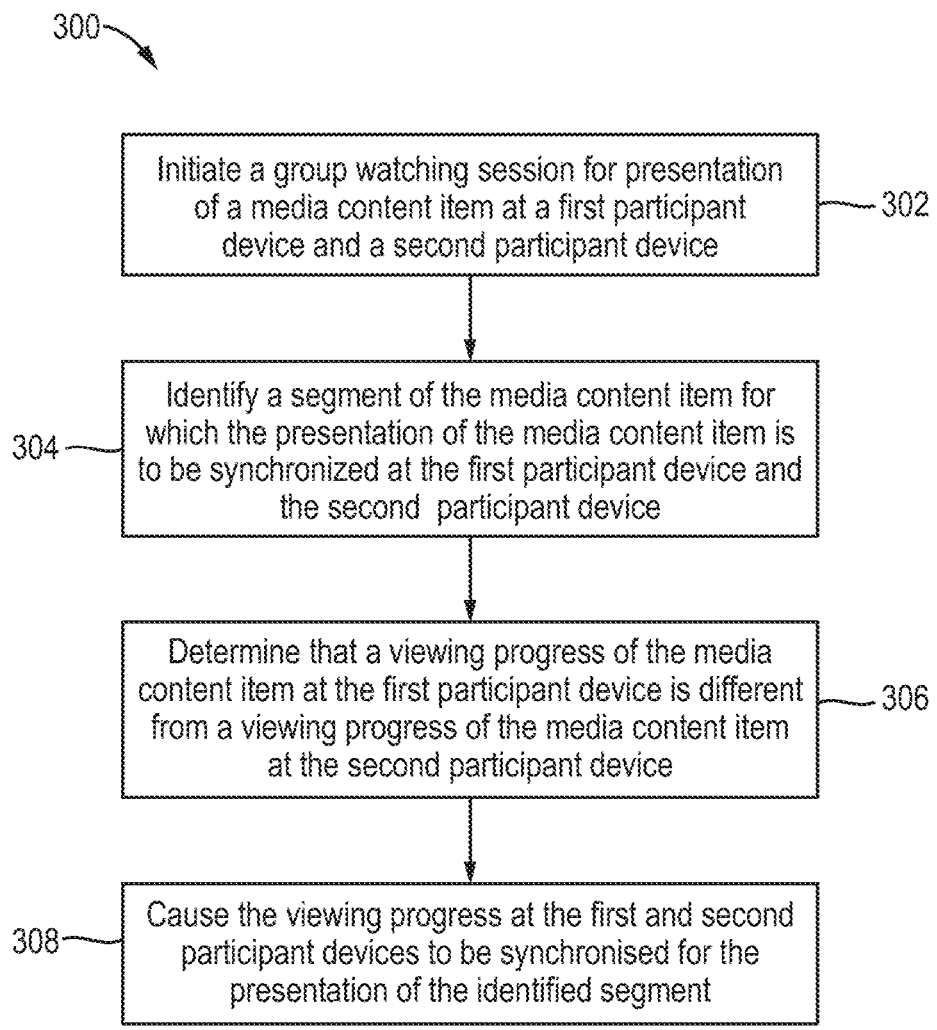

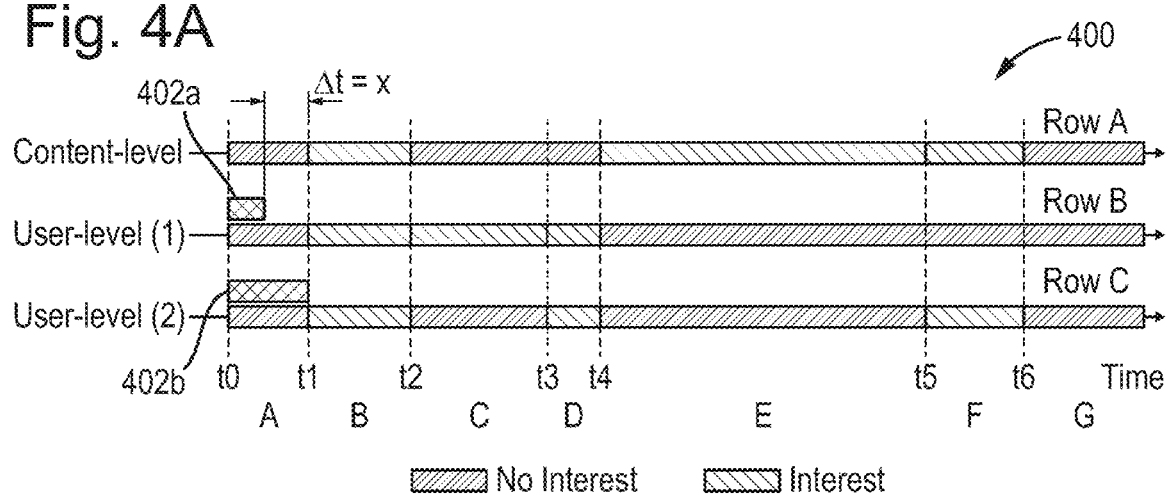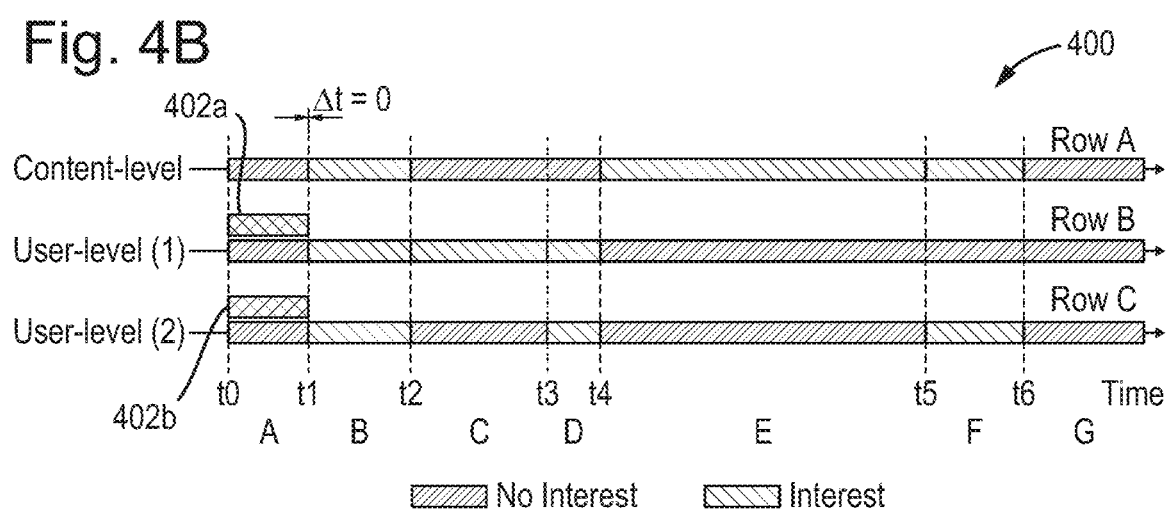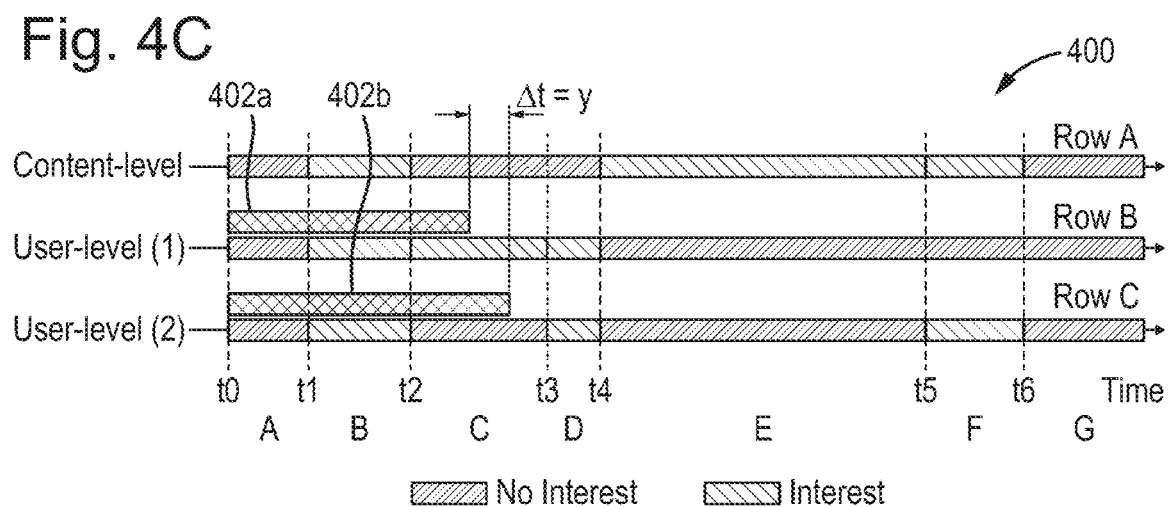

METHODS AND SYSTEMS FOR OPERATING A GROUP WATCHING SESSION

BACKGROUND

The present disclosure relates to methods and systems for operating a group watching session. Particularly, but not exclusively, the present disclosure relates to generating a synchronization schedule for a group watching session and ensuring that viewing progress for users participating in the group watching session is synchronized for a key segment of a media content item presented in the group watching session.

SUMMARY

Virtual group watching of a media content item has gained a lot of popularity in recent time. For example, where multiple users are not able to, or choose not to, physically meet, they may participate in a group watching session of a media content item, in which the viewing of the media content item is synchronized between multiple user devices. In such a group watching session, if one user pauses content, it will pause for everyone, and resume for everyone when so requested. However, operating a group watching session in this manner does not account for how each participant may wish to participate in the group watching session, e.g., based on the preferences of each user. For example, different users may have different ways of watching and/or may like/dislike different elements of the media content item presented in the group watching session. Additionally or alternatively, one or more external factors, such as whether a particular user is interrupted during the group watching session, may cause the media content item presented in the group watching session to be unnecessarily paused for all users. In order to enhance the experience of the group watching session, it is desirable to provide a degree of flexibility in the synchronisation of the presentation of the media content item between multiple user devices.

Systems and methods are provided herein for operating a group watching session, e.g., by identifying which segments of a media content item presented in the group watching session are of common interest, and selectively controlling which segments of the media content item may become unsynchronized and which segments are to be synchronized for presentation. Such systems and methods may provide an improved experience for the user, e.g., by allowing users to individually control playback of certain segments of a media content item, e.g., to account for interruptions and/or individual levels of interest in certain segments, while synchronizing playback for key segments of the media content item.

According to some examples, methods and systems are provided, e.g., for improved operation of a group watching session, in which a group watching session is initiated for presentation of a media content item at a first participant device and a second participant device. A segment of the media content item is identified for which the presentation of the media content item, e.g., the segment of the media content item, is to be synchronized at the first participant device and the second participant device. In some examples, the identified segment is a segment identified as a segment of potential interest to one or more users in the group watching session. A viewing progress of the media content item is determined at the first participant device that is different from a viewing progress of the media content item at the second participant device. In response to determining that the viewing progress of the media content item at the first participant device is different from the viewing progress of the media content item at the second participant device, causing the viewing progress at the first and second participant devices to be synchronized for the presentation of the identified segment.

In some examples, causing the viewing progress at the first and second participant devices to be synchronized comprises presenting additional content to at least one of the first or second participant devices to synchronize the viewing progress at the first and second participant devices, e.g., by the start of the identified segment. Additionally or alternatively, causing the viewing progress at the first and second participant devices to be synchronized comprises controlling, e.g., automatically controlling, a playback speed of the media content item on at least one of the first or second participant devices to synchronize the viewing progress of the first and second participant devices, e.g., by the start of the segment.

In some examples, determining that the viewing progress of the media content item at the first participant device is different from the viewing progress of the media content item at the second participant device comprises determining a duration of the media content item between the viewing progress at each of the first and second participant devices and the segment of the media content item. Additionally or alternatively, determining that the viewing progress of the media content item at the first participant device is different from the viewing progress of the media content item at the second participant device comprises determining a duration of the media content item between the viewing progress at the first participant device and the viewing progress at the second participant device.

In some examples, a synchronization schedule for the group watching session is generated. The synchronization schedule may comprise at least one segment for which the viewing progress of the first and second participants is to be (or needs to be) synchronized, and at least one segment for which the viewing progress of the first and second participants is not to be (or needs not be) synchronized. For example, viewing progress at the first and second participants may need to be synchronized for a first segment, and viewing progress at the first and second participants may need not be synchronized for a second segment, but may still be synchronised, e.g., coincidentally.

In some examples, playback functionality (e.g., rewind, fast forward, pause, etc.) is controlled, e.g., automatically controlled, for at least one of the first or second participant devices based on the synchronization schedule.

In some examples, one or more content-level factors associated with the media content item are determined. In some examples, one or more participant-level factors associated with a user profile are determined. In some examples, the synchronization schedule is generated based on at least one of the one or more content-level factors and/or the one or more participant-level factors.

In some examples, a conflict between at least one content-level factor and at least one participant-level factor is determined. In some examples, the synchronization schedule is confirmed or updated based on the conflict.

In some examples, controlling the playback speed of the media content item causes at least one of the first and second participant devices to skip a portion of the media content item. In some examples, the skipped portion is presented at the first participant device and/or the second participant device after presentation of the identified segment.

In some examples, one or more interruptions in the viewing progress are determined at one or more of the first or second participant devices. In response to determining one or more interruptions in the viewing progress at one or more of the first and second participant devices, the viewing progress of the first and second participant devices is caused to be synchronized for the identified segment of the media content item.

In some examples, a group communication mode is initiated for the identified segment of the media content item.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 is a flowchart representing a process for operating a group watching session, in accordance with some examples of the disclosure;

FIG. 4A illustrates a diagrammatic representation of various segments of a media content item, in accordance with some examples of the disclosure;

FIG. 4B illustrates a diagrammatic representation of various segments of a media content item, in accordance with some examples of the disclosure;

FIG. 4C illustrates a diagrammatic representation of various segments of a media content item, in accordance with some examples of the disclosure;

DETAILED DESCRIPTION

Figure 1A:
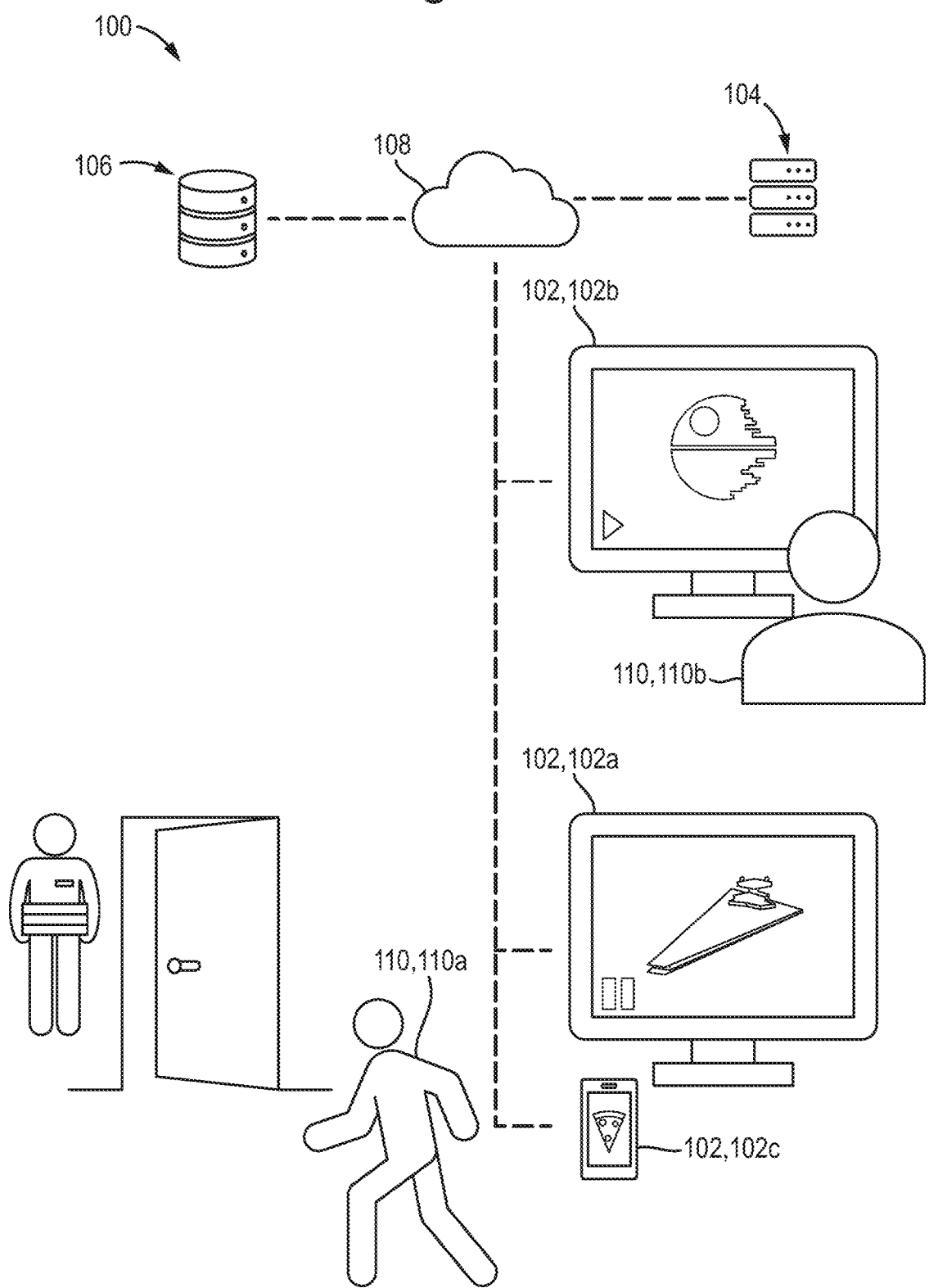
FIG. 1A illustrates an overview of a system for operating a group watching session, in accordance with some examples of the disclosure.
Figure 1B:
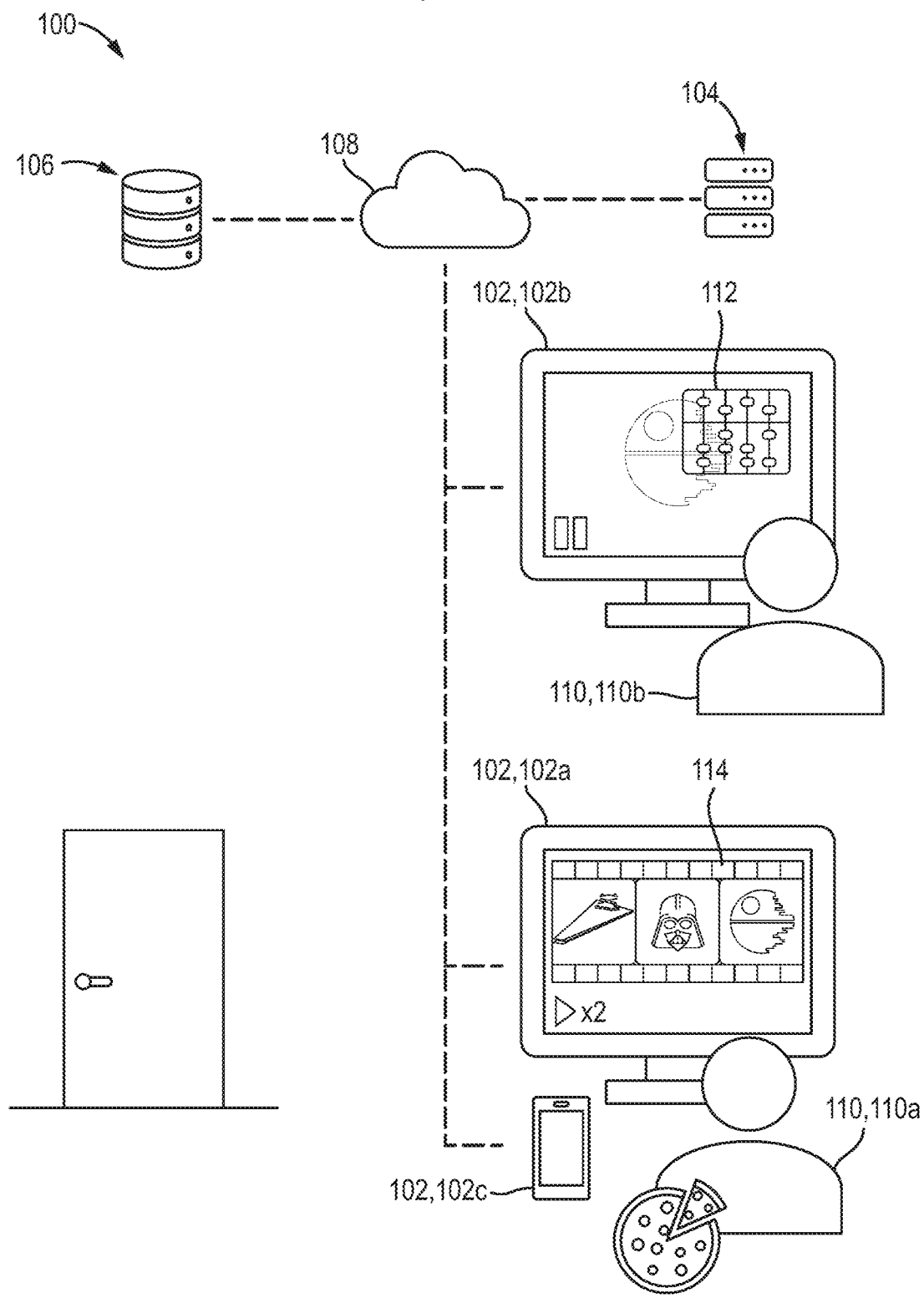
FIG. 1B illustrates another overview of the system for operating a group watching session, in accordance with some examples of the disclosure.

FIGS. 1A and 1B illustrate an overview of a system 100 for operating a group watching session in which the presentation of a media content item is shared for multiple users. In particular, the example shown in FIGS. 1A and 1B illustrates two users, e.g., a first user 110a and a second user 110b, participating in a group watching session in which a media content item is being viewed or consumed on respective user (e.g., participant) devices 102a and 102b. In FIG. 1A, the viewing progress of the media content item at the first user device 102a has been interrupted, e.g., as a result of the first user 110a receiving a pizza delivery at the door. In such a case, the viewing progress of the media content item at the first user device 102a has been paused at a first segment of the media content item, while the viewing progress of the media content item at the second user device 102b has continued to a later segment of the media content item, which typically cannot happen during a conventional group watching session. In FIG. 1B, the first user 110a has returned from collecting the pizza and wishes to resume watching the media content item. However, the viewing progress of the media content item is now different at the first user device 102a compared to at the second user device 102b. Such a situation may be undesirable as the later segment of the media content item is an important segment for which viewing progress of the media content item should be synchronized across the first and second user devices 102a and 102b, e.g., to allow the first and second users 110a, 110b to consume the media content item at substantially the same time. The present disclosure, as discussed in detail below, provides improved systems and methods for operating a group watching session in which the synchronization of the viewing progress of a media content item across multiple user devices is controlled to allow the viewing progress at different user devices to vary, e.g., to become unsynchronized and resynchronized. For example, viewing progress may be allowed to vary where different users have different levels of interest in a segment of a media content item, and viewing progress may be synchronized for another segment of the media content item, e.g., a segment containing important information and/or where group communication is required.

In the example shown in FIGS. 1A and 1B, system 100 includes multiple user devices 102, such as a tablet computer, a smartphone, a smart television, or the like, configured to display or otherwise provide, e.g., aurally, media content to one or more respective users. System 100 may also include network 108 such as the Internet, configured to communicatively couple user devices 102 to one or more servers 104 and/or one or more content databases 106 from which media content, such as TV shows, movies and/or advertisement content, may be obtained for display on the user devices 102. User devices 102 and the one or more servers 104 may be communicatively coupled to one another by way of network 108, and the one or more servers 104 may be communicatively coupled to content database 106 by way of one or more communication paths, such as a proprietary communication path and/or network 108. In some examples, server 104 may be a server of a service provider who provides media content for display on user devices 102.

In some examples, system 100 may comprise an application that provides guidance through an interface, e.g., a graphical user interface, that allows users to efficiently navigate media content selections, navigate an interactive media content item, and easily identify media content that they may desire, such as content provided on a database on one or more live streams. Such guidance is referred to herein as an interactive content guidance application or, sometimes, a content guidance application, a media guidance application, or a guidance application. In some examples, the application may be configured to provide a recommendation for a content item, e.g., based on a user profile and/or an endorsement profile of the content item. For example, the application may provide a user with a recommendation based for a content item based on one or more endorsements present, e.g., visibly and/or audibly present, in the content item. In some examples, the application provides users with access to a group watching session and/or group communication functionality. For example, the application may provide a user with an option to join a group watching session and participate in group communication with one or more other users participating in the group watching session.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "computing device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
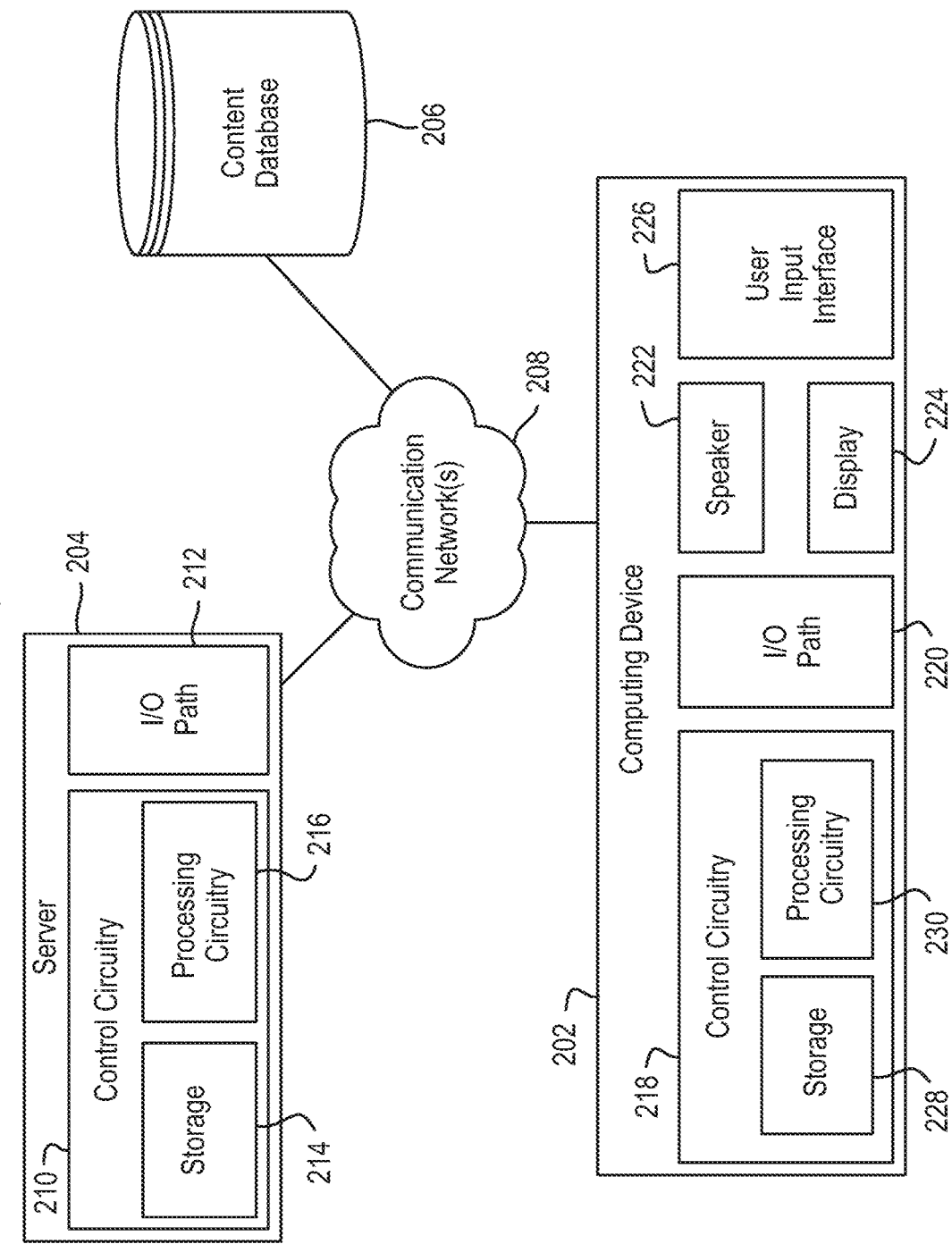
FIG. 2 is a block diagram showing components of an example system for operating a group watching session, in accordance with some examples of the disclosure.

FIG. 2 is an illustrative block diagram showing example system 200 configured to display media content. Although FIG. 2 shows system 200 as including a number and configuration of individual components, in some examples, any number of the components of system 200 may be combined and/or integrated as one device, e.g., as user device 102. System 200 includes computing device 202, server 204 (e.g., server 106 and/or server 108), and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 220. Control circuitry 210 and/or 218 may be based on any suitable processing circuitry such as processing circuitry 216 and/or 220. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to view an interactive media content item and/or select one or more programming options of the interactive media content item, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

FIG. 3 is a flowchart representing an illustrative process 300 for operating a group watching session, in accordance with some examples of the disclosure. FIGS. 4A to 4F show a synchronization schedule for the group watching session and various viewing progresses of multiple users in the group watching session. While the example shown in FIGS. 3 and 4A to 4F refers to the use of system 100, as shown in FIGS. 1A and 1B, it will be appreciated that the illustrative process shown in FIGS. 3 and 4A to 4F, and any of the other following illustrative processes, may be implemented on system 100, either alone or in combination with any other appropriately configured system architecture, such as system 200 shown in FIG. 2.

At 302, control circuitry initiates a group watching session for presentation of a media content item at multiple user devices, e.g., at the first user device 102a and the second user device 102b. In the example shown in FIGS. 1A and 1B, the media content item being presented is The Empire Strikes Back. However, in one or more other examples (not shown), the media content item may be a media content item being presented during a group communication session, such as a slideshow presented during a work meeting or a lecture. For example, the group watching session may comprise a group communication session having videoconference and/or teleconference functionality. In some examples, the group communication is initiated in response to a user initiating a group watching session. For example, a first user may set up a group watching session and invite one or more other users to join. When another user joins the group watching session, they may be also joined to the group watching session, and optionally a group communication session.

At 304, control circuitry identifies a segment of the media content item for which the presentation of the media content item is to be synchronized at the first user device 102a and the second user device 102b. For example, control circuitry may cause a synchronization schedule to be generated for the media content item, e.g., based on one or more content-level factors and/or one or more user-level factors.

In the context of the present disclosure, a content-level factor is any appropriate parameter and/or data associated with the media content item. For example, a content-level factor may be related to the content of one or more segments (e.g., at least one scene/frame) of the media content item. In some examples, a content-level factor may comprise metadata describing the content of one or more segments of the media content item, such as an actor and/or filming location shown in a segment, or the subject-matter of a slide of a slideshow being shown in a segment, such as a portion of an academic module. In some examples, the content-level factor may relate to the importance of the content of the segment. For example, the content-level factor may indicate that a segment of a movie contains information key to the understanding of the movie plot, or a segment of a webinar contains information key to the understanding of the webinar topic. In some examples, the content-level factor may be determined based on historic viewing statistics relating to the number of users that have previously watched the segment. Additionally or alternatively, the content-level factor may be determined based on an understanding of how one or more other users previously responded to the segment, e.g., control circuitry may be configured to determine the popularity of a segment of a media content item based on metadata relating to one or more reviews of the segment and/or online discussions about the segment. In some examples, control circuitry maybe configured to track the number/type of user inputs made into a user device during previous presentation of the segment, e.g., to determine whether one or more users chose to pause the presentation of the media content item and/or enter into group communication. Using the above example of the media content item being the movie The Empire Strikes Back, a content-level factor may show that important information relevant to the understanding of the plot occurs in the scene where Darth Vader discloses to Luke Skywalker that they are related. Control circuitry may determine such a content-level factor based on metadata supplied by the producer of the movie, metadata added by a service provider streaming the movie for the group watching session, and/or as a result of analyzing metadata relating to history user comment/reaction to that particular scene.

In the context of the present disclosure, a user-level factor is any appropriate parameter and/or data associated with a user participating in the group watching session. For example, control circuitry may determine a user-level factor by accessing a user profile storing a user preference for certain content of one or more segments (e.g., at least one scene/frame) of the media content item. For example, a user preference may relate to a preferred (or a non-preferred) actor. Additionally or alternatively, a user-level factor may be determined from the user's past viewing history and/or viewing patterns, and/or by comparing the user's past viewing history and/or viewing patterns with another user's past viewing history and/or viewing patterns. For example, control circuitry may be configured to analyse how a user typically watches content, e.g., how often a user controls playback function (such as pause, rewind, etc.), when a user controls playback function, when a user controls playback function in relation to certain types of content, and/or one or more user actions subsequent to watching content (e.g., reading trivia about the content, and/or discussing the content with one or more other users). For example, one user may not have much understanding of content relating to space and time travel. As such, when watching content relating to space and time travel that user may more frequently pause/rewind the content than another user who has a greater level of understanding of such content. Continuing with the above example of the media content item being the movie The Empire Strikes Back, a user-level factor may be a user's preference for sci-fi movies, and, in particular, the characters Darth Vader and Luke Skywalker. Additionally or alternatively, a user profile may contain one or more rules indicating which segments of the movie may be of more interest and which segments may be of less interest. For example, a user may set, or control circuitry may determine, e.g., based on viewing history, a rule indicating a lower interest in segments of the movie that are dialogue-based, and a rule indicating higher interest in in segments of the movie that are action-based.

FIGS. 4A to 4F each show a synchronization schedule 400 generated using a combination of content-level factors and user-level factors for multiple segments of a media content item. For example, synchronization schedule 400 may be generated for segments A-G of the movie The Empire Strikes Back. Row A of synchronization schedule 400 represents the segments of the media content item for which the presentation of the media content item likely requires synchronization at the first user device 102a and the second user device 102b, based on content-level factors. For example, content-level factors for the movie The Empire Strikes Back may indicate that presentation of segments B, E and F will likely require synchronization at the first user device 102a and the second user device 102b. Row B of synchronization schedule 400 represents the segments of the media content item for which the presentation of the media content item likely requires synchronization at the first user device 102a and the second user device 102b, based on user-level factors for the first user 102a. For example, user-level factors for the first user 110a may indicate that presentation of segments B, C and D will likely require synchronization at the first user device 102a and the second user device 102b. Row C of synchronization schedule 400 represents the segments of the media content item for which the presentation of the media content item likely requires synchronization at the first user device 102a and the second user device 102b, based on user-level factors for the second user 102b. For example, user-level factors for the second user 110b may indicate that presentation of segments B, D and F will likely require synchronization at the first user device 102a and the second user device 102b.

In some examples, a segment may be identified as a segment of the media content item for which the presentation of the media content item is to be synchronized at the first user device 102a and the second user device 102b (hereinafter referred to as a synchronized segment or segment of interest) where at least one of the rows of synchronization schedule 400 indicates a need for synchronization. For example, control circuitry may determine that segments B, C, D, E and F of synchronization schedule 400 require synchronization based on the content-level factors and the user-level factors of each of the first and second users 110a, 110b. In particular, control circuitry may determine that:

segment B requires synchronization, since at least one of rows A, B and C indicate that segment B is a segment of interest; segment C requires synchronization, since row B indicates that segment B is a segment of interest; segment D requires synchronization, since at least one of rows B and C indicates that segment D is a segment of interest; segment E requires synchronization, since row A indicates that segment E is a segment of interest; and segment F requires synchronization, since at least one of rows A and C indicates that segment F is a segment of interest. However, as discussed in more detail below, control circuitry may determine which segments require synchronization by assessing a conflict (or lack thereof) between one or more content-level factors and the user-level factors of each of the first and second users 110a, 110b.

Figure 4D:
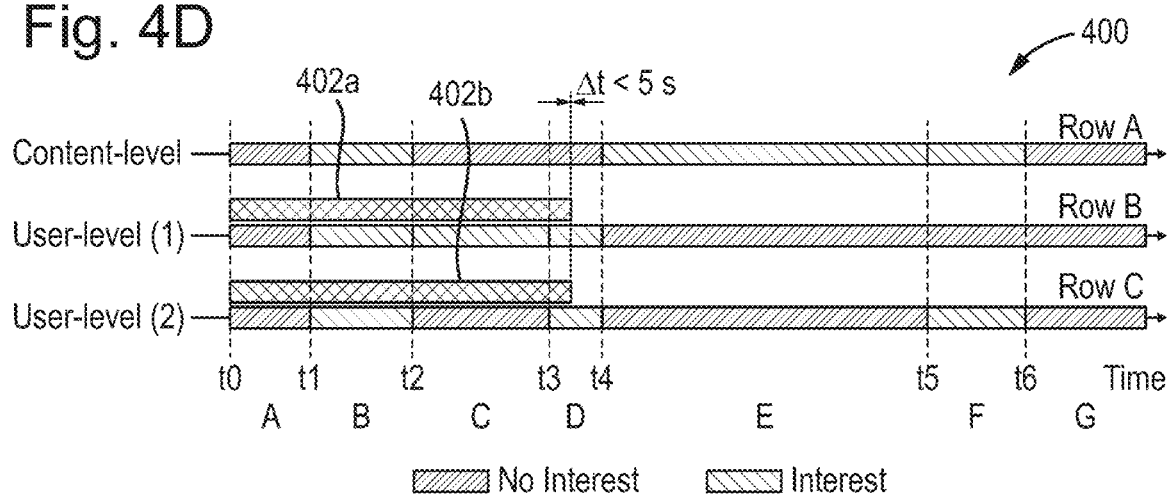
FIG. 4D illustrates a diagrammatic representation of various segments of a media content item, in accordance with some examples of the disclosure.
Figure 4E:
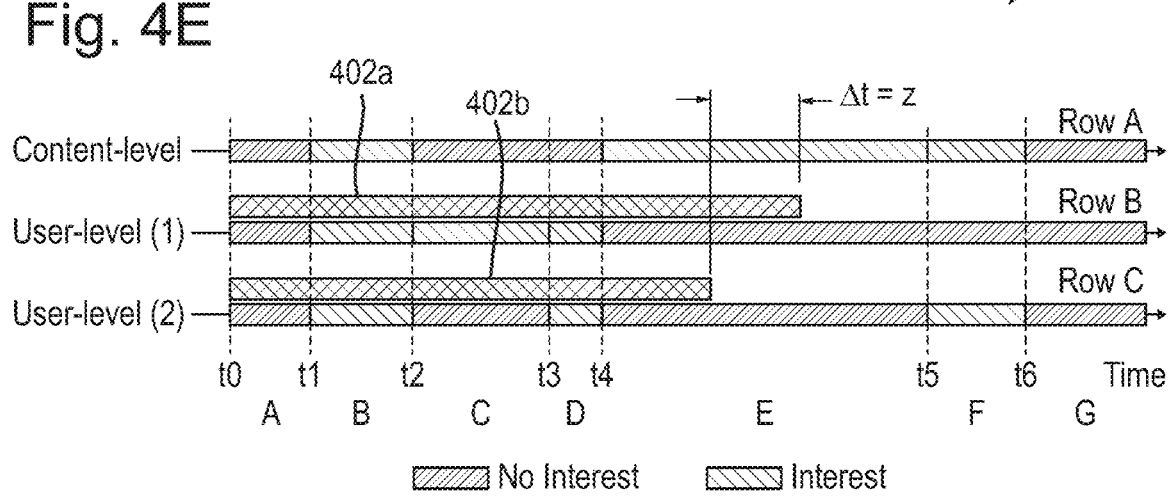
FIG. 4E illustrates a diagrammatic representation of various segments of a media content item, in accordance with some examples of the disclosure.
Figure 4F:
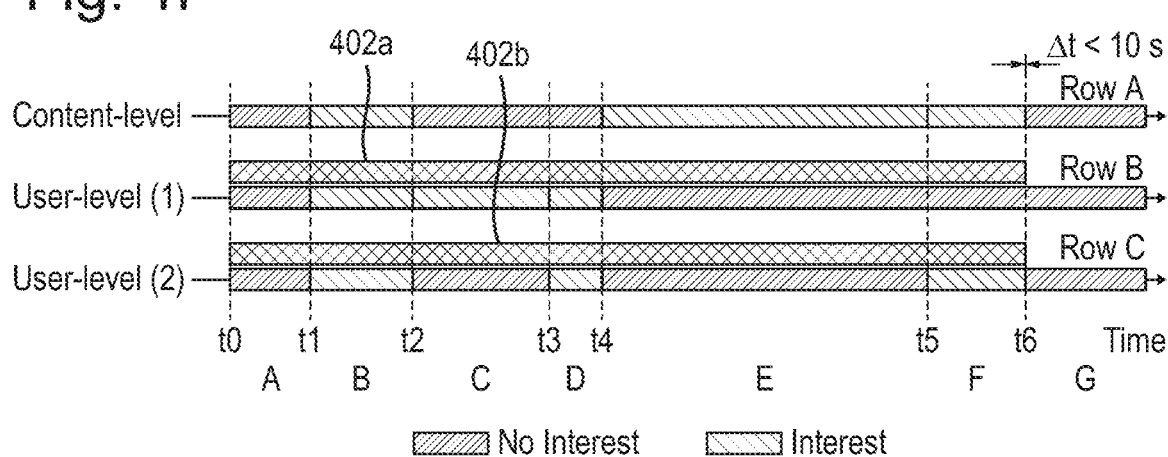
FIG. 4F illustrates a diagrammatic representation of various segments of a media content item, in accordance with some examples of the disclosure.

At 306, control circuitry determines the viewing progress of each of the first and second users 110a, 110b. For example, control circuitry may determine that the viewing progress of the media content item at the first participant device is different from a viewing progress of the media content item at the second participant device. In the example shown in FIGS. 4A to 4F, the viewing progress of the first user 110a is represented by progress bar 402a and the viewing progress of the second user 110b is represented by progress bar 402b. Referring to the examples shown in FIG. 1A, the viewing progress of the first user 110a has been interrupted, e.g., by a pizza delivery at the door. As such, the first user 110a pauses the viewing of the media content item. In the example shown in FIG. 1A, the first user 110a has paused The Empire Strikes Back during a first scene (e.g., segment A), while the viewing progress of the second user 102b has continued through segment A (while the first user 102a collects the pizza). Such operation of the group watching session is permitted since segment A has been identified as a segment that does not require synchronization. In some examples, control circuitry may be configured to pause the viewing progress of the second user 102b at the start of another scene (e.g., segment B), e.g., based on segment B being identified as a segment of interest. For example, FIG. 4A shows the viewing progress of the second user 110b having reached time t=t1, which is the start of segment B. In some examples, as the viewing progress of a user approaches a new segment, control circuitry may be configured to access synchronization schedule 400 to determine whether the upcoming segment is a segment of interest. For example, segment B of the movie The Empire Strikes Back may comprise the scene where Darth Vader reveals that he is Luke Skywalker's father. As such, it is desirable for the viewing progress of the first user 102a and the second user 102b to be synchronized for viewing of this key scene. In the example shown in FIG. 4A, the difference between the viewing progress of the first user 102a and the second user 102b is calculated as Δt=x, which represents the viewing time elapsed, e.g., in minutes and seconds, between the moment the first user 102a paused the movie during segment A and start of the next segment of interest, e.g., segment B.

At 308, control circuitry causes the viewing progress at the first and second user devices 102a, 102b to be synchronized for the presentation of at least one of the identified segments. For example, in response to determining that the viewing progress at the second user device 102b has reached the start of a segment of interest, control circuitry causes the viewing progress at the second user device 102b to pause, e.g., so that the second user 110b cannot progress further through an important scene of the movie. In the example shown in FIG. 1B, the viewing progress at the second user device 102b is paused at time t=t1, which is Δt=x ahead of the viewing progress at the first user device 102a, as shown in FIG. 4A. In some cases, the difference between the viewing progress at the first user device 102a and the second user device 102b may be small, e.g., a few seconds, or a minute. As such, the first user 110a may be allowed to watch the portion of the movie elapsed between the time the first user 110a paused the movie and the start of segment B, while the viewing progress at the second user device 102b remains paused at the start of segment B. In other cases, the difference between the viewing progress at the first and second user devices 102a, 102b may be a larger amount, e.g., a few minutes, or longer, such as in the example shown in FIGS. 1A and 1B, where the first user 110a pauses the movie to collect a pizza from the door. In some examples, control circuitry may be configured to determine a difference (Δt) between the viewing progress at the first and second user devices 102a, 102b, and compare the difference to a threshold difference. For example, a threshold difference may be set at a default amount, e.g., 1 minute, by the operator of the group watching session. Additionally or alternatively, the threshold difference may be set according to one or more user profiles of the users participating in the group watching session. Where the difference between the viewing progress at the first user device 102a and the second user device 102b is greater than the threshold difference, control circuitry may be configured to perform one or more additional operations. For example, control circuitry may be configured to cause additional content 112 to be presented to the second user 110b, which can keep the second user 110b entertained while the first user 110a catches up to the viewing progress at the second user device 102b. The additional content may comprise any content suitable for presentation, such as information about the movie, an interactive game, deleted scenes, director's commentary, a commercial, a communication session (e.g., a video call with another user in the group watching session), etc. In some examples, control circuitry is configured to access a library of additional content and select the additional content based on one or more factors, such as the Δt between the viewing progress at the first and second user devices 102a, 102b (e.g., control circuitry may select one or more commercials having a total run time corresponding to the Δt value), and/or one or more user preferences, e.g., for a particular type of content. Selection of the additional content is described below in more detail in relation to the example shown in FIGS. 5A and 5B. In the example shown in FIG. 1A, the additional content 112 comprises information relating to synchronization schedule 400 and the viewing progress of the other user(s) in the group watching session, which enables the second user 110b to understand for what reason and how long the movie will be paused for. In some examples, the additional content 112 may be displayed on one or more other user devices, such as a smart phone 102c or tablet, in addition to or instead on the second user device 102b.

In some examples, in response to determining a difference, e.g., Δt=x, between the viewing progress at the first user device 102a and the second user device 102b, control circuitry may control a playback speed of the media content item on at least one of the first or second user devices 102a, 102b in order to reduce the Δt value, and cause the viewing progress at the first and second user devices 102a, 102b to be synchronized for the presentation of at least one of the identified segments. In the example shown in FIG. 1B, control circuitry causes the playback speed of the movie to be paused at the second user device 102b and increased at the first user device 102a, e.g., to reduce the amount of time for which presentation of the movie at the second user device 102b is suspended. Additionally, while increasing the playback speed, control circuitry may generate one or more trick play functions 114 to help the first user 110a understand the content being displayed at an increased speed. In some examples, control circuitry may be configured to monitor the additional content 112 presented on the second user device 102b and adjust the playback speed at the first user device 102a based on the content presented at the second user device 102b. For example, where presenting the additional content comprises opening communication between the second user 110b and one or more other users, the playback speed at the first user device 102a may be adjusted based on the state of the communication, e.g., whether a conversation between the second user 110b and one or more other users is ongoing or not.

In this manner, the method outlined by 302 to 308 provides improved operation of a group watching session, e.g., by allowing presentation of a media content item at multiple user devices to become unsynchronized for segments of the media content item for which the likelihood of user interest is low, e.g., segments A and G, and to become synchronized (and/or resynchronized) for segments of the media content item for which the likelihood of user interest is high, e.g., segments B to F. However, in one or more other examples, the manner in which the likelihood of user interest for each of the segments is determined may vary, as described below.

The actions or descriptions of FIG. 3 may be used with any other example of this disclosure, e.g., the example described below in relation to FIGS. 5A and 5B. In addition, the actions and descriptions described in relation to FIG. 3 may be done in any suitable alternative orders or in parallel to further the purposes of this disclosure.

Figure 5A:
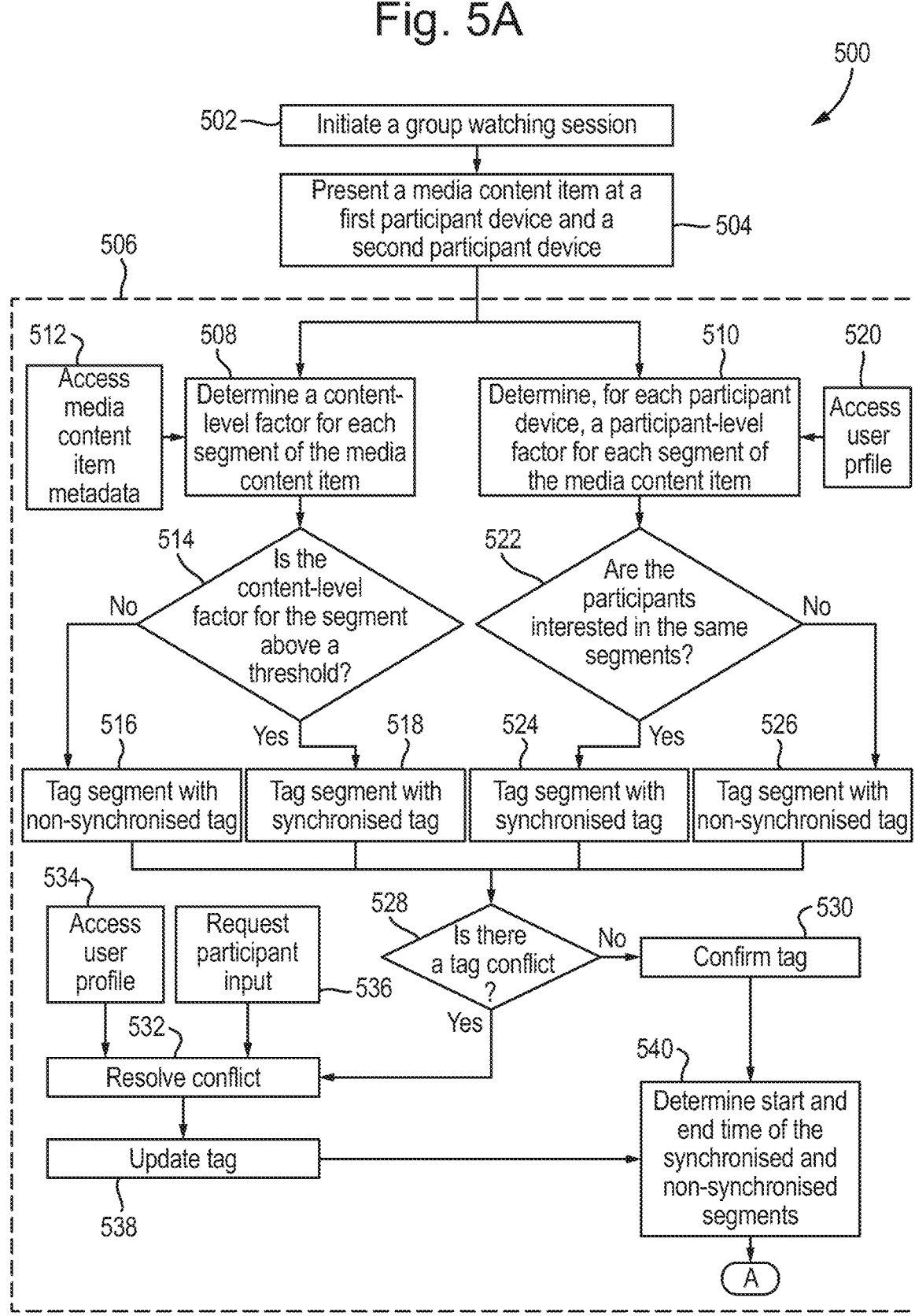
FIG. 5A is a flowchart representing another process for operating a group watching session, in accordance with some examples of the disclosure.
Figure 5B:
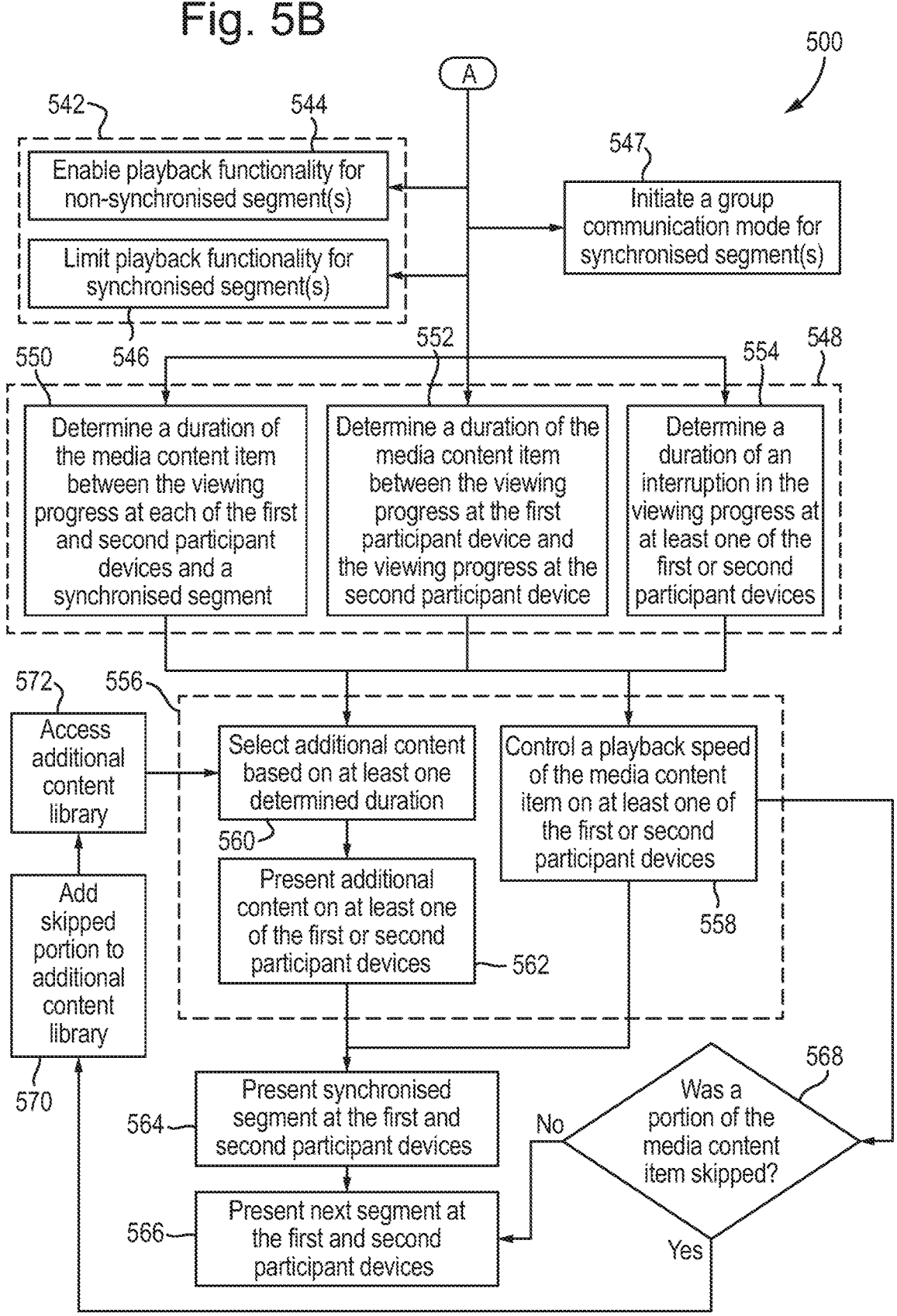
FIG. 5B is a continuation of the flowchart shown in FIG. 5A.

FIGS. 5A and 5B show a flowchart representing another process for operating a group watching session, in accordance with some examples of the disclosure. While the example shown in FIGS. 5A and 5B refers to the use of system 100, as shown in FIGS. 1A and 1B, it will be appreciated that the illustrative process shown in FIGS. 5A and 5B, and any of the other illustrative processes described herein, may be implemented on system 100, either alone or in combination with any other appropriately configured system architecture, such as system 200.

At 502, control circuitry initiates a group watching session, e.g., based on a user instruction received by a guidance application. For example, a group of users may have arranged to meet virtually for a group watching session of a media content item. In some examples, the group watching session may be started by one of the users in the group who has selected a media content item for presentation. In the context of the present disclosure, the term group watching session is understood to mean any session in which multiple users participate to share in the presentation of a media content item, such as a movie streamed by an OTT content provider, a lecture/webinar streamed by an educational institution, or a meeting/presentation hosted in a virtual meeting space. While the systems and methods described herein are applicable to many use cases, the below example describes the systems and methods with reference to the movie The Empire Strikes Back.

At 504, control circuitry causes the movie The Empire Strikes Back to be presented at a first user device 102a (e.g., a first participant device) and a second user device 102b (e.g., a second participant device). For example, control circuitry may cause the movie to be streamed from one or more content providers to the first and second user devices 102a, 102b, e.g., so that the movie is cued to be presented upon one of the first user 110a and the second user 110b requesting playback. In other words, once playback has been selected, the movie starts at the same time at the first and second user devices 102a, 102b so that its presentation is synchronized. For example, in the example shown in FIGS. 4A to 4F, the presentation of The Empire Strikes Back starts at t=t0 at the first and second user devices 102a, 102b, as shown by respective progress bars 402a and 402b.

At 506, control circuitry generates synchronization schedule 400, e.g., in a similar manner to that described under 304 of process 300. Additionally or alternatively, to that described for 304, 506 comprises 508 to 540. In the example shown in FIGS. 4A to 4F, 5A and 5B, synchronization schedule 400 is used by control circuitry to identify one or more segments of the movie for which its presentation is to be synchronized at the first user device 102a and the second user device 102b, and one or more segments of the movie for which its presentation is allowed to be unsynchronized at the first user device 102a and the second user device 102b.

Moving from 504, process 500 comprises 508, at which control circuitry determines at least one content-level factor for each segment of the movie, and 510, at which control circuitry determines, for each user device 102a and 102b, at least one user-level factor for each segment of the movie, in a similar manner to that described above under 304.

In the example shown in FIG. 5A, at 512 control circuitry accesses media content item metadata which is used to determine one or more content-level factors for the movie. For example, metadata relating to the movie may indicate which scenes of the movie comprise certain types of content. For example, metadata for The Empire Strikes Back may indicate which actors/characters are present in one or more scenes/frames of the movie, timing information relating to the start point, the end point, and the length of various scenes of the movie, and information indication which scenes of the movie contain key plot information. Additionally or alternatively, control circuitry may access metadata at 512 to determine which scenes of the movie are popular, e.g., trending, based on one or more online reviews or discussions. In some examples, the metadata may relate to one or more historic user inputs made while viewing the movie, e.g., in a previous group watching session. For example, metadata may contain information regarding which portions of the movie are typically paused, rewound, fast-forwarded, etc. by users. In this manner, control circuitry may determine which segments of the movie are likely to be of interest to the first and second users 110a, 110b in the group watching session, and thus which segments of the movie are likely to require synchronization at the first and second user devices 102a, 102b.

At 514 control circuitry determines if the content-level factors for the movie are above respective content-level factor thresholds. For example, where the metadata for the movie indicates that a scene contains a certain character, e.g., Darth Vader, control circuitry may determine the prominence of the character in the scene, e.g., based on the amount of dialogue the character has in the scene, or the number of actions performed by the character in the scene. A content-level factor may be above a content-level factor threshold where the character is prominent in the scene. Additionally or alternatively, where the metadata for the movie indicates one or more ratings for the scene, control circuitry may compare the rating for the scene to a rating threshold. A content-level factor may be above a content-level factor threshold where the rating for the scene is above the rating threshold. In this manner, control circuitry may determine, based on one or more content-level factors being below respective thresholds, that segment A of The Empire Strikes Back, starting at t=t0 and ending at t=t1, does not contain content of likely interest to the first and second users 110a, 110b. As a result of this determination, control circuitry tags segment A with an unsynchronized tag at 516. In a similar manner, control circuitry may determine, based on one or more content-level factors being above respective thresholds, that segment B of The Empire Strikes Back, starting at t=t1 and ending at t=t2, contains content of likely interest to the first and second users 110a, 110b. As a result of this determination, control circuitry tags segment B with a synchronized tag at 518. Continuing in this manner, control circuitry tags segment C, starting at t=t2 and ending at t=t3, with a unsynchronized tag at 516, segment D, starting at t=t3 and ending at t=t4, with a unsynchronized tag at 516, segment E, starting at t=t4 and ending at t=t5, with a synchronized tag at 518, segment F, starting at t=t5 and ending at t=t6, with a synchronized tag at 518, and segment G, starting at t=t6 and ending at t=t7 (not shown) with a unsynchronized tag at 516. In the example shown in FIGS. 4A to 4F, row A of synchronization schedule 400 illustrates the tagging of the various segments of the movie as described above.

Returning to 510, control circuitry accesses, at 520, a user profile for each user in the group watching session. For example, control circuitry may access a first user profile of the first user 102a and a second user profile of the second user 102b. At 510, control circuitry determines one or more user preferences for each user participating in the group watching session. For example, control circuitry may access, e.g., at 512, a user profile for each user participating in the group watching session to determine one or more topics of interest of the user. In some examples, a user preference may be determined from one or more selected topics in the user's profile. For example, the first user 110a may indicate, e.g., by manual input, interest in one or more characters, such as Darth Vader, whereas the second user 110b may indicate that they dislike, or have no preference either way for the character Darth Vader. Additionally or alternatively, a preference of a user may be determined by analyzing historic viewing data of the user, one or more past communications of the user, and/or any other appropriate data that may indicate what the user is interested in, such as the number and/or type of playback functions requested during consumption of media content. In this manner, control circuitry may derive one or more user-level factors indicating which segments of a media content item a user is likely to be interested in, e.g., by virtue of a segment containing a favorite actor, being of a particular genre, relating to a particular subject-matter, etc. In some examples, control circuitry may be configured to cross reference a user-level factor with a content-level factor of the media content item to determine whether a user is likely to be interested in a particular segment of the media content item. For the avoidance of doubt, 510 may be performed in a similar manner to that described above in relation to 304, in combination with, or instead of, the process outlined in this paragraph.

In the example shown in FIGS. 4A to 4F, control circuitry determines, based on the user-level factors determined for the first user 110a, that the first user 110a is likely to be interested in segments B, C and D, and is not likely to be interested in segments A, E, F and G. Additionally, control circuitry determines, based on the user-level factors determined for the second user 110b, that the second user 110b is likely to be interested in segments B, D and F, and is not likely to be interested in segments A, C, E and G. In the example shown in FIGS. 4A to 4F, row B illustrates the user-level factors of the first user 110a for each segment of the movie, and row C illustrates the user-level factors of the second user 110b for the corresponding segments of the movie.

At 522, control circuitry determines whether the users are interested in the same segments. For example, control circuitry may determine whether the segments that the first user 110a is likely to be interested in are the same segments that the second user 110b is likely to be interested in. In other words, control circuitry determines whether the user-level factor(s) of the first user 110a match the user-level factor(s) of the second user 110b, e.g., for each segment of the movie that either of the first and second users 110a, 110b may be interested in. Where the user-level factors for the users match for a segment indicating likely interest, control circuitry tags that segment with a synchronized tag at 524. Where the user-level factors for the users do not match for a segment or where no interest is indicated by both user's user-level factors, control circuitry tags that segment with a unsynchronized tag at 526. For example, synchronization schedule 400 indicates the user-level factors indicate interest and match for segments B and D. As such, segments B and D are each tagged with a synchronized tag at 524, since both users are likely to be interested in those segments. Whereas segments A, C, E, F and G are each tagged with an unsynchronized tag at 526, since none of the users or not all users are likely to be interested in those segments.

At 528, control circuitry determines whether there is a tag conflict for one or more of the segments. Following the above example, segment A was tagged with a first unsynchronized tag at 516 and a second unsynchronized tag at 526. As such, control circuitry determines that there is no tag conflict and proceeds to 530 where the tag for segment A is confirmed as an unsynchronized tag, e.g., control circuitry confirms that segment A is a segment for which presentation of the movie is allowed to be unsynchronized. In a similar manner, there is no tag conflict for each of segments C, E and G, and, as such, control circuitry confirms that each of segments C, E and G is a segment for which presentation of the movie is allowed to be unsynchronized. Segment B was tagged with a first synchronized tag at 518 and a second synchronized tag at 524. As such, control circuitry determines that there is no tag conflict and proceeds to 530 where the tag for segment B is confirmed as a synchronized tag, e.g., control circuitry confirms that segment B is a segment for which presentation of the movie is to be synchronized. However, segment D was tagged with an unsynchronized tag at 516 and a synchronized tag at 524, and segment F was tagged with a synchronized tag at 518 and an unsynchronized tag at 526. As a result, control circuitry determines that there is a tag conflict for these segments and moves to 532. In some examples, where the number of users is greater than two, control circuitry may perform a count of the number of synchronized tags and the number of unsynchronized tags added to a segment, and determine whether a tag conflict exists based on the number of synchronized tags compared to the number of unsynchronized tags, e.g., by determining whether there are more of one type of tag than the other type of tag.

At 532, control circuitry attempts to resolve any tag conflicts determined at 528. For example, control circuitry may access one or more user profiles at 534 and/or request user input to resolve the conflict at 536. For example, a user profile may indicate a preference to prioritize a synchronized tag based on user-level factors over an unsynchronized tag based on content-level factors, e.g., where multiple (e.g., all)

users are likely to be interested in a segment even when one or more content-level factors indicate a low chance of interest, such as for segment D. In some cases, a user profile may indicate a preference to prioritize an unsynchronized tag based on user-level factors over a synchronized tag based on content-level factors, e.g., where multiple (e.g., all) users are likely to not be interested in a segment even when one or more content-level factors indicate a high chance of interest, such as for segment E. In other cases, a user profile may indicate a preference to prioritize a synchronized tag based on a content-level factor over an unsynchronized tag based on user-level factors, e.g., where content-level factors indicate a high chance of interest and user-level factors indicate a difference in the preferences of the users participating in the group watching session, such as for segment F. In some examples, control circuitry may request user confirmation or override of any prioritization determined from one or more user profiles at 536. Otherwise, if control circuitry is unable to determine any user preferences, control circuitry may request user input to determine which type of tag to prioritize for the segment.

At 538, control circuitry updates the tag in response to resolving the conflict at 532. For example, control circuitry may update the tag for segment D to a synchronized tag, update the tag for segment E to an unsynchronized tag, and update the tag for segment F to a synchronized tag.

At 540, control circuitry determines, e.g., based on 530 and 538 in combination with metadata for the movie, the start and end time of each of the synchronized segments, e.g., segments B, D and F, and the start and end time of each of the unsynchronized segments, e.g., segments A, C, E and G. In the context of the present disclosure, 508 to 540 contribute to the generation of synchronization schedule 400. However, in one or more other examples, generation of the synchronization schedule 400 may comprise any other appropriate steps that result in at least one segment of the movie being identified as a segment for which the presentation of the movie is to be synchronized at the first user device 102a and the second user device 102b.

At 542, control circuitry controls playback functionality for one or more segments of the movie, e.g., in response to generating synchronization schedule 400. For example, control circuitry may enable playback functionality for one or more non-synchronized segments at 544, and limit playback functionality for one or more synchronized segments at 546. In some examples, playback functionality may be enabled for one or more non-synchronized segments to allow respective users to pause, fast forward, rewind, etc., the movie based on individual preferences or other external factors, such as interruptions. Additionally or alternatively, playback functionality may be disabled for one or more synchronized segments to prevent respective users pausing, fast forwarding, rewinding, etc., the movie based on individual preferences or other external factors, such as interruptions. In this manner, 542 allows for different users in the group watching session to progress at different viewing rates, e.g., based on the synchronization schedule 400.

At 547, control circuitry initiates a group communication mode, e.g., to enable group communication between two or more users in the group watching session. The group watching session may be initiated in time for users to communicate during a synchronized segment. For example, the first user 110a and the second user 110b may wish to communicate to discuss content of common interest in a synchronized segment. In some examples, a group communication mode may be initiated during, or after (e.g., immediately after) a synchronized segment, so that users can discuss the content of the synchronized segment, which may be of common interest. In some examples, a group communication mode may form at least part of additional content presented to one or more users in the group watching session, e.g., additional content that is presented at 562, discussed below.

At 548, control circuitry determines the viewing progress of each of the first and second users 110a, 110b, e.g., in a manner similar to the described under 306. For example, control circuitry may determine that the viewing progress of the media content item at the first user device 102a is different from a viewing progress of the media content item at the second user device 102b. In other words, control circuitry may determine that the viewing progress of the movie is not synchronized across the users in the group watching session, and that an upcoming segment of the movie is a segment for which viewing progress is to be synchronized at first and second user devices 102a, 102b participating in the group watching session. At 556, in response to such determining, control circuitry causes the viewing progress at the first and second user devices 102a, 102b to be synchronized for the presentation of the upcoming segment. The below examples, with reference to FIGS. 4A to 4F, illustrate various ways of determining that the viewing progress at one user device is behind the viewing progress of another device, and corresponding ways in which viewing progress may be synchronized.

In some examples, at 550, control circuitry determines a duration of the movie between the viewing progress at each of the first and second participant devices and a synchronized segment, e.g., see FIG. 4A. In FIG. 4A, the viewing progress at the second user device 102b has already reached the start of a first synchronized segment, segment B. As such, control circuitry causes the viewing progress at the second user device 102b to be paused, and determine how far behind the viewing progress at the first user device 102a is, e.g., $\Delta t = x$. In response, control circuitry causes the viewing progress at the first user device 102a to increase in speed at 558, e.g., by performing one or more trick play functions 114, as shown in FIG. 1B, until the difference between the viewing progress at the first user device 102 and the second user device 102b reduces, e.g., below a threshold value, such as 5 seconds, or to zero. In the example shown in FIG. 4B, the difference between the viewing progress at the first user device 102a and the second user device 102 is $\Delta t = 0$, meaning that the viewing progress is synchronized for the start of segment B.

Additionally or alternatively, at 552, control circuitry determines a duration of the media content item between the viewing progress at the first user device 102a and the viewing progress at the second user device 102b, e.g., see FIG. 4C. In FIG. 4C, the viewing progress at the second user device 102b is ahead of the viewing progress at the first user device 102a by a certain amount, e.g., $\Delta t = y$. In response, control circuitry automatically controls the playback speed at both the first user device 102 and the second user device 102b to cause the viewing progress to be synchronized. For example, control circuitry may cause the playback speed at the first user device 102a to increase in speed at 558, e.g., by performing one or more trick play functions 114, as shown in FIG. 1B, and/or the playback speed at the second user device 102b to decrease in speed, e.g., by selecting and presenting additional content 112 at 560 and 562 respectively, as shown in FIG. 1B, until the difference between the viewing progress at the first user device 102 and the second user device 102b reduces, e.g., below a threshold value, such as 5 seconds, or to zero. In the example shown in FIG. 4D, the difference between the viewing progress at the first user device 102 and the second user device 102 is Δt<5 seconds, meaning that the viewing progress is substantially synchronized by at least the start of segment D.

Additionally or alternatively, at 554, control circuitry determines a duration of an interruption in the viewing progress at at least one of the first or second user devices 102a, 102b. In the example shown in FIG. 4E, control circuitry determines the duration of an interruption caused by a pizza delivery to the first user 110a. In some examples, control circuitry may be configured to access data on the first user's smart phone 102c to determine when and for how long for an interruption to the viewing progress at the first user device 102a will be. For example, control circuitry may access an app on the smart phone 102c indicating that a delivery is in progress. In some examples, control circuitry may automatically pause the viewing progress at the first user device 102a when delivery of the pizza is indicated on the smart phone 102c. Control circuitry may then start a timer to determine a period for which the movie remains paused at the first user device 102a, e.g., a time between control circuitry automatically pausing the movie, and the first user 110a issuing an instruction to resume playback. In the example shown in FIG. 4E, this period is shown as Δt=z. In response, control circuitry automatically controls the playback speed at both the first user device 102 and the second user device 102b to cause the viewing progress to be synchronized. For example, control circuitry may select and present additional content 112 at 560 and 562 respectively at the second user device 102b, as shown in FIG. 1B, until the difference between the viewing progress at the first user device 102 and the second user device 102b reduces, e.g., below a threshold value, such as 5 seconds, or to zero. In the example shown in FIG. 4F, the difference between the viewing progress at the first user device 102a and the second user device 102 is Δt<10 seconds, meaning that the viewing progress is substantially synchronized by at least the end of segment F.

At 564, control circuitry causes each synchronized segment, e.g., segments B, D and F, to be presented at the first and second user devices 102a, 102b, in response to one or more of the catch-up mechanisms outlined above.

At 556, control circuitry causes presentation of the movie to continue to the next segment, e.g., from segment F to segment G.

In some examples, process 500 comprises 566, at which control circuitry determines whether a portion of the movie was skipped as a result of the playback speed control at 558. For example, where the viewing progress at one user device was behind the viewing progress at another user device by an amount larger than a threshold amount, such as 10 minutes or 15 minutes, which may be caused by a longer interruption, it may be desirable to skip a relatively large portion of the movie when catching-up the user who fell far behind. As such, control circuitry may cause a trick play function to skip one or more entire scenes when implementing 558. Where control circuitry determines that a larger portion, e.g., an entire scene or a portion of content greater than a threshold duration (e.g., 5 minutes), to be skipped, process 500 moves to 570, otherwise, the next segment is presented at 566.

At 570, control circuitry causes the skipped portion to be added to a library of additional content, which is accessed at 572 when control circuitry selects additional content to be presented during one or more of the above catch-up mechanisms. In this manner, where one user has previously been caused to skip a portion of the movie as a result of falling behind, and then finds themselves being ahead of one or more other users at a later stage of the group watching session, control circuitry may cause the skipped portion to be presented to that user when presenting additional content to synchronize the viewing progress of the group watching session. In this manner, a user may not actually miss any of the movie by virtue of the improved methods and systems for providing flexible viewing during a group watching session.

The actions or descriptions of FIGS. 5A and 5B may be used with any other example of this disclosure. In addition, the actions and descriptions described in relation to FIGS. 5A and 5B may be done in any suitable alternative orders or in parallel to further the purposes of this disclosure.

The above disclosure is directed to techniques for presenting media content at a plurality of computing devices according to a schedule of in-sync and out-of-sync consumption of the content together with participant interactions (e.g., chat, audio, and/or video) related to the content. The disclosed techniques create and manage the schedule of in-sync/out-of-sync consumption by predicting, identifying, and analyzing segments of the media content that correspond to likely group interaction, and thereby helps to facilitate informed and interested participant interactions with the content. More particularly, the systems and methods use a hierarchy of content-level interest and user-level interest to identify segments of interest to specify in-sync segments and out-of-sync segments of the schedule. Content-level interest may be used to identify primary in-sync segments, e.g., a segment related to a climax portion of a movie or show, a widely reviewed or discussed segment of the content, a group presentation segment in a meeting, a group instruction segment in a remote-education context, etc. In-sync segments identified according to content-level interest may be applied to the entire group. Additional in-sync segments may be applied to a subset of the group, and be based on participant-level interest in other segments of the content. For instance, besides the primary in-sync segments, a subset of participants may be interested in other segments that relate to a particular genre (humor, action, horror, etc.), favorite actors, a sub-topic in a meeting or lecture, etc. Other segments of the media content item, besides the primary in-sync segments (based on content-level interest) and additional in-sync segments (based on participant-level interest) may then be identified as out-of-sync segments. The systems and methods may accordingly generate different synchronization schedules for different participants based at least in part on additional in-sync segments that differ among the various participants.

Additionally or alternatively, the systems and methods may customize synchronization schedules for participants by dynamically enabling participant-level playback functionality (e.g., rewind, fast forward, pause, etc.) to accommodate participant media-consumption preferences, and to enforce consumption according to the schedule and bring the participants together as a group for at least primary in-sync segments. In some examples, the systems and methods dynamically enable playback functionality during out-of-sync segments and/or in-sync segments applied to a subset of participants. The techniques also help to manage participant interactions in various ways. For instance, the systems and methods may provide additional (e.g., supplemental) content during out-of-sync segments and/or the additional in-sync segments applied to a subset of participants. The systems and methods may dynamically enable participant-level playback functionality for the supplemental content. In some examples, the systems and methods determine participant interest in particular content segments and enable/disable interaction and/or playback functionality based on the determined interest. For instance, if a subset of the participants are interested in a particular segment, the systems and methods may create and populate a breakout session for interaction with the particular segment. Further, the systems and methods may, for a period of time leading up to the particular segment, block discussion (e.g., chat, video, audio) of the particular segment to avoid revealing unknown or future outcomes/context (e.g., spoilers) to the subset of participants. If a participant is uninterested in the particular segment, the systems and methods may allow certain playback functionality (e.g., rewind, fast forward, pause, etc.), and may monitor media consumption together with the synchronization schedule to limit playback functionality, as needed, to enforce group consumption of later in-sync segments.

In some examples according to the present disclosure, a method of operating a group watching session may comprise one or more of, or various combinations of, the following processes: i) determine one or more segments for group interaction (i.e., a segment of interest) based on one or more content-level factors; ii) determine, based on the one or more content factors, a first set of one or more segments for group interaction; iii) determine one or more group segments for group interaction based on one or more participant-level factors; iv) determine, based on one or more participant-interest factors, a second set of one or more interactive segments; v) determine consumption/playback habits based on one or more participant-level factors; vi) determine, based on one or more media-consumption factors, a media-consumption pattern for a particular participant; vii) identify/monitor for interruptions, and receive information regarding at least one interruption unrelated to the media content, e.g., that is caused by an external factor; viii) for each participant/user device, create a timeline according to the synchronization schedule; ix) generate based on the first and second sets of one or more interactive segments, a schedule for consuming the content, wherein the schedule includes one or more in-sync segments and one or more out-of-sync segments; ix) the one or more in-sync segments further comprises a first in-sync segment based at least in part on the first set of one or more interactive segments, and a second in-sync segment based at least in part on the second set of one or more interactive segments, wherein the first in-sync segment and the second in-sync segment are distinct; x) dynamically allow selective playback functionality, in particular, during out-of-sync segments, in which the playback functionality may be based on participant-interest factors and media consumption factors of a particular participant; xi) selectively enable, for the particular participant, media-playback functionality during at least one of the one or more out-of-sync segments; xii) monitor actual media consumption and schedule for consuming the content, and modify media-playback functionality for the particular participant to bring participants back together for in-sync segments; xiii) modify, based at least in part on actual media consumption of the particular participant and an upcoming in-sync segment, the media playback functionality for the particular participant.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    initiating a group watching session for presentation of a media content item at a first participant device and a second participant device;
    generating a synchronization schedule for the group watching session, the synchronization schedule comprising at least one segment of the media content item for which the viewing progress of the first and second participant devices is indicated to be synchronized, and at least one segment of the media content item for which the viewing progress of the first and second participant devices is indicated to not be synchronized;
    identifying, based on the synchronization schedule, a segment of the media content item for which the viewing progress of the media content item is indicated to be synchronized at the first and second participant devices;
    detecting that the viewing progress of at least one of the first and second participant devices has reached the identified segment for which the viewing progress of the media content item is indicated to be synchronized by the synchronization schedule; and
    based on the detecting that the viewing progress of the at least one of the first and second participant devices has reached the identified segment for which the viewing progress of the media content item is indicated to be synchronized by the synchronization schedule:
        determining that a viewing progress of the media content item at the first participant device is different from a viewing progress of the media content item at the second participant device; and
        in response to the determining, causing the viewing progress at the first and second participant devices to be synchronized for the presentation of the identified segment.

2. The method of claim 1, wherein the causing the viewing progress at the first and second participant devices to be synchronized comprises at least one of:
    presenting additional content to at least one of the first or second participant devices to synchronize the viewing progress at the first and second participant devices by the start of the identified segment; or
    automatically controlling a playback speed of the media content item on at least one of the first or second participant devices to synchronize the viewing progress of the first and second participant devices by the start of the identified segment.

3. The method of claim 1, wherein the determining that the viewing progress of the media content item at the first participant device is different from the viewing progress of the media content item at the second participant device comprises at least one of:

determining a duration of the media content item between the viewing progress at each of the first and second participant devices and the identified segment of the media content item; or determining a duration of the media content item between the viewing progress at the first participant device and the viewing progress at the second participant device.

4. The method of claim 1, the method comprising controlling playback functionality for at least one of the first or second participant devices based on the synchronization schedule.

5. The method of claim 1, wherein the method comprises at least one of:
   determining one or more content-level factors associated with the media content item; or
   determining one or more participant-level factors associated with a user profile,
   wherein the synchronization schedule is generated based on at least one of the one or more content-level factors or the one or more participant-level factors.

6. The method of claim 5, wherein the method comprises:
   determining a conflict between at least one content-level factor and at least one of the participant-level factors; and
   updating the synchronization schedule based on the conflict.

7. The method of claim 1, wherein the causing the viewing progress at the first and second participant devices to be synchronized comprises automatically controlling a playback speed of the media content item on at least one of the first or second participant devices to synchronize the viewing progress of the first and second participant devices by the start of the identified segment, wherein automatically controlling the playback speed of the media content item causes at least one of the first and second participant devices to skip a portion of the media content item, the method further comprising:
   presenting the skipped portion at the first participant device and/or the second participant device after presentation of the identified segment.

8. The method of claim 1, the method comprising:
   determining one or more interruptions in the viewing progress at one or more of the first or second participant devices; and
   in response to determining one or more interruptions in the viewing progress at the one or more of the first and second participant devices, causing the viewing progress of the first and second participant devices to be synchronized for the identified segment of the media content item.

9. The method of claim 1, the method comprising:
   initiating a group communication mode for the identified segment of the media content item.

10. A system comprising control circuitry configured to:
    initiate a group watching session for presentation of a media content item at a first participant device and a second participant device;
    generate a synchronization schedule for the group watching session, the synchronization schedule comprising at least one segment of the media content item for which the viewing progress of the first and second participant devices is indicated to be synchronized, and at least one segment of the media content item for which the viewing progress of the first and second participant devices is indicated to not be synchronized;
    identify, based on the synchronization schedule, a segment of the media content item for which the viewing progress of the media content item is to be synchronized at the first and second participant devices;
    detect that at least one of the first and second participant devices has reached the identified segment for which the viewing progress of the media content item is indicated to be synchronized by the synchronization schedule; and
    based on the detecting that the viewing progress of the at least one of the first and second participant devices has reached the identified segment for which the viewing progress of the media content item is indicated to be synchronized by the synchronization schedule:
       determine that a viewing progress of the media content item at the first participant device is different from a viewing progress of the media content item at the second participant device; and
       in response to the determining, cause the viewing progress at the first and second participant devices to be synchronized for the presentation of the identified segment.

11. The system of claim 10, wherein the control circuitry is configured to cause the viewing progress at the first and second participant devices to be synchronized by at least one of:
    presenting additional content to at least one of the first or second participant devices to synchronize the viewing progress at the first and second participant devices by the start of the identified segment; or
    automatically controlling a playback speed of the media content item on at least one of the first or second participant devices to synchronize the viewing progress of the first and second participant devices by the start of the identified segment.

12. The system of claim 10, wherein the control circuitry is configured to determine that the viewing progress of the media content item at the first participant device is different from the viewing progress of the media content item at the second participant device by at least one of:
    determining a duration of the media content item between the viewing progress at each of the first and second participant devices and the identified segment of the media content item; or
    determining a duration of the media content item between the viewing progress at the first participant device and the viewing progress at the second participant device.

13. The system of claim 10, wherein the control circuitry is configured to control playback functionality for at least one of the first or second participant devices based on the synchronization schedule.

14. The system of claim 10, wherein the control circuitry is configured to at least one of:
    determine one or more content-level factors associated with the media content item; or
    determine one or more participant-level factors associated with a user profile,
    wherein the synchronization schedule is generated based on at least one of the one or more content-level factors or the one or more participant-level factors.

15. The system of claim 14, wherein the control circuitry is configured to:
    determine a conflict between at least one content-level factor and at least one of the participant-level factors; and
    update the synchronization schedule based on the conflict.

16. The system of claim 10, wherein the control circuitry is configured to cause the viewing progress at the first and second participant devices to be synchronized by automatically controlling a playback speed of the media content item on at least one of the first or second participant devices to synchronize the viewing progress of the first and second participant devices by the start of the identified segment, wherein automatically controlling the playback speed of the media content item causes at least one of the first and second participant devices to skip a portion of the media content item, wherein the control circuitry is further configured to:

present the skipped portion at the first participant device and/or the second participant device after presentation of the identified segment.

17. The system of claim 10, wherein the control circuitry is configured to:

determine one or more interruptions in the viewing progress at one or more of the first or second participant devices; and in response to determining one or more interruptions in the viewing progress at the one or more of the first and second participant devices, cause the viewing progress of the first and second participant devices to be synchronized for the identified segment of the media content item.

18. The system of claim 10, wherein the control circuitry is configured to:

initiate a group communication mode for the identified segment of the media content item.

19. The method of claim 1, wherein the identified segment is a first segment, the method further comprising:

identifying, based on the synchronization schedule, a second segment of the media content item for which the viewing progress of the first and second participant devices is indicated by the synchronization schedule to not be synchronized;

detecting that the viewing progress of at least one of the first and second participant devices has reached the identified second segment for which the viewing progress of the first and second participant devices is indicated by the synchronization schedule to not be synchronized; and based on the detecting that the viewing progress of the at least one of the first and second participant devices has reached the identified second segment for which the viewing progress of the first and second participant devices is indicated by the synchronization schedule to not to be synchronized:

refraining from causing the viewing progress at the first and second participant devices to be synchronized for the presentation of the identified second segment.

20. The method of claim 1, wherein the detecting that the viewing progress of at least one of the first and second participant devices has reached the identified segment for which the viewing progress of the media content item is indicated to be synchronized by the synchronization schedule further comprises:

detecting that the viewing progress of both the first and second participant devices has reached the identified segment for which the viewing progress of the media content item is indicated to be synchronized by the synchronization schedule;

based on the detecting that the viewing progress of both the of the first and second participant devices has reached the identified segment for which the viewing progress of the media content item is indicated to be synchronized by the synchronization schedule:

determining that the viewing progress of the media content item at the first participant device is different from the viewing progress of the media content item at the second participant device; and in response to the determining, causing the viewing progress at the first and second participant devices to be synchronized for the presentation of the identified segment.

* * * * *